US012566623B1

(12) United States Patent

Hussain et al.

(10) Patent No.: US 12,566,623 B1

(45) Date of Patent: Mar. 3, 2026

(54) DEPLOYING UNIQUE ACTIONS TO MULTIPLE ACCOUNTS AND REGIONS THROUGH A SINGLE OPERATION

(71) Applicant: Amazon Technologies, Inc., Reno, NV (US)

(72) Inventors: Amjad Hussain, Bellevue, WA (US); Maheshwar Gundelly, Lynnwood, WA (US); Ravikumar Viswanathan, Issaquah, WA (US); Yinglong Wang, Redmond, WA (US); Anand Ravi Kiran Surada, Austin, TX (US); Diwakar Chakravarthy, Kirkland, WA (US); Asif Hussain, Redmond, WA (US); Guanghui Guo, Mill Creek, WA (US)

(73) Assignee: Amazon Technologies, Inc., Reno, NV (US)

( * ) Notice: Subject to any disclaimer, the term of this patent is extended or adjusted under 35 U.S.C. 154(b) by 821 days.

(21) Appl. No.: 17/364,405

(22) Filed: Jun. 30, 2021

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| | | | |
|---|---|---|---|
| 8,805,971 B1* | 8/2014 | Roth ..................... | G06F 9/5072 709/220 |
| 10,200,246 B1* | 2/2019 | Rachamadugu .... | H04L 41/0806 |
| 10,318,265 B1* | 6/2019 | To .......................... | H04L 67/34 |
| 10,318,285 B1* | 6/2019 | Jodoin ............... | G06F 11/3612 |
| 10,628,148 B1* | 4/2020 | Raikov ..................... | G06F 8/61 |
| 2011/0314447 A1* | 12/2011 | Malyshev ................ | G06F 8/60 717/110 |
| 2012/0131468 A1* | 5/2012 | Friedlander ......... | H04L 41/0836 715/735 |
| 2013/0179574 A1* | 7/2013 | Calder ............... | G06F 9/45533 709/226 |
| 2014/0122666 A1* | 5/2014 | Malhotra .............. | G06F 3/0482 709/220 |
| 2016/0259795 A1* | 9/2016 | Brandys ................ | G06F 40/197 |
| 2017/0075712 A1* | 3/2017 | Krishna .................. | G06F 8/61 |
| 2020/0084112 A1* | 3/2020 | Kandaswamy ..... | G06F 30/3323 |
| 2022/0129095 A1* | 4/2022 | Seering ..................... | G06F 8/38 |
| 2023/0221934 A1* | 7/2023 | Xu .......................... | H04L 67/34 |

* cited by examiner

*Primary Examiner* — Jorge A Chu Joy-Davila
(74) *Attorney, Agent, or Firm* — Hogan Lovells US LLP

(57) ABSTRACT

Various embodiments provide for modelling, creating, and managing multiple accounts and regions through a single operation from a single account. In various embodiments, a user can define as code various the fundamental structure for an entire application workload including logical deployment stages and resources across multiple accounts. Users can also specify various actions, definitions, and parameters for deployment across multiple target accounts, regions or both, including automating orchestration of the deployment actions. In some embodiments, the cloud provider receives such a request from a primary user account to deploy a plurality of actions across a plurality of target accounts, regions or both. At least some the plurality of target accounts, regions or both provide (i.e., host) different aspects of an application.

20 Claims, 7 Drawing Sheets

202

Application X

204a          Account A

204b          Account B

204c          Account C

204d          Account D

204e          Account E

400

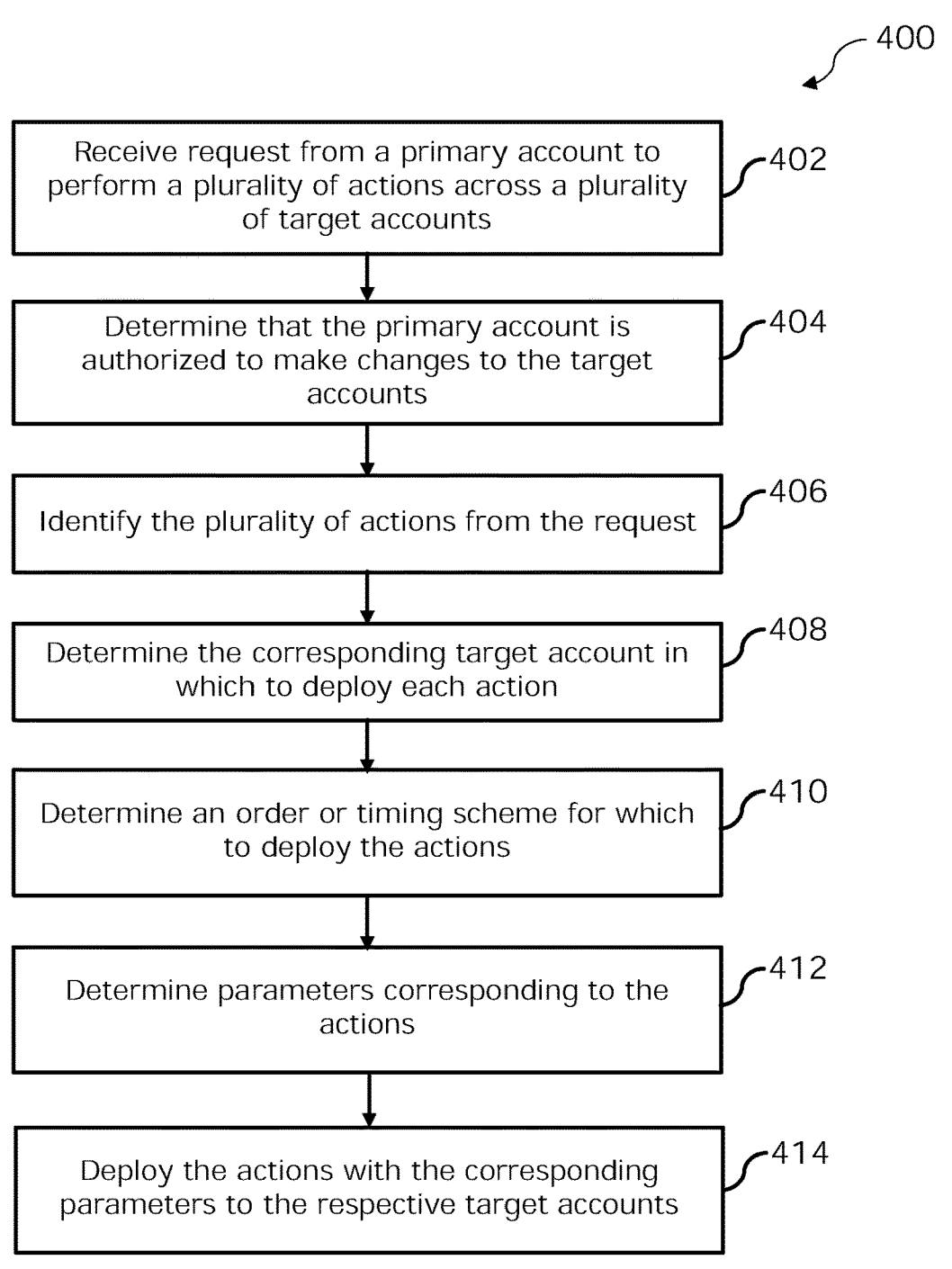

Receive request from a primary account to perform a plurality of actions across a plurality of target accounts ⟍402

Determine that the primary account is authorized to make changes to the target accounts ⟍404

Identify the plurality of actions from the request ⟍406

Determine the corresponding target account in which to deploy each action ⟍408

Determine an order or timing scheme for which to deploy the actions ⟍410

Determine parameters corresponding to the actions ⟍412

Deploy the actions with the corresponding parameters to the respective target accounts ⟍414

FIG. 4

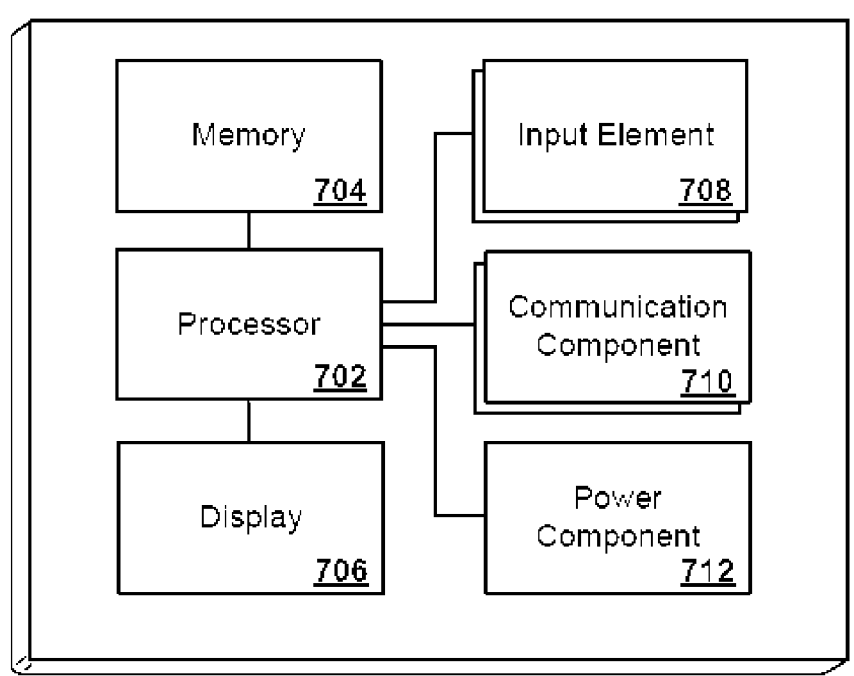
FIG. 7

DEPLOYING UNIQUE ACTIONS TO MULTIPLE ACCOUNTS AND REGIONS THROUGH A SINGLE OPERATION

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. The resources can be physical resources or virtual resources provided through virtualization. In some instances, in order to support a single large application, a customer may utilize multiple accounts and/or resources in different regions. The different accounts and/or resources may be used to support different aspects of the application. However, it can become cumbersome to model, create, and manage these accounts and/or resources separately.

BRIEF DESCRIPTION OF THE DRAWINGS

Various embodiments in accordance with the present disclosure will be described with reference to the drawings, in which:

FIG. 4. illustrates an example process for managing an application that is distributed across multiple accounts through a single operation from a single account, in accordance with various embodiments.

FIG. 7 illustrates components of an example computing device that can be used to perform aspects of the various embodiments.

DETAILED DESCRIPTION

Systems and methods in accordance with various embodiments of the present disclosure overcome one or more of the aforementioned and other deficiencies experienced in conventional approaches to managing aspects of resource sharing and allocation in an electronic environment. In particular, various embodiments provide for modelling, creating, and managing different accounts and regions through a single operation from a single account. In various embodiments, a user can define as code various the fundamental structure for an entire application workload including logical deployment stages and resources across multiple accounts. Users can also specify various actions, definitions, and parameters for deployment across multiple accounts and/or regions, including automating orchestration of the deployment actions. In some embodiments, the cloud provider receives such a request from a primary user account to deploy a plurality of actions across a plurality of accounts and/or regions. The plurality of accounts and/or regions may be a plurality of secondary or target user accounts and/or regions, and at least some the plurality of accounts and/or regions provide (i.e., host) different aspects of an application, such as a web application. Thus, the actions to be deployed to the accounts and/or regions may be different. The cloud provider receives the request and determines one or more corresponding actions to deploy to the individual accounts and/or regions defined in the request. For example, the request includes a first action to be deployed to a first account and a second action to be deployed to a second account. The cloud provider then deploys the respective actions to the accounts. In some embodiments, one or more of the plurality of actions includes creating a new account. In some embodiments, the request defines one or more resources required for deploying the actions to the plurality of accounts and/or regions, respectively. The one or more resources include at least one of a database, compute functions, front-end files, identity and access management roles or groups, CI/CD pipelines, among others. Various other applications, processes, and uses are presented below with respect to the various embodiments.

Figure 1:
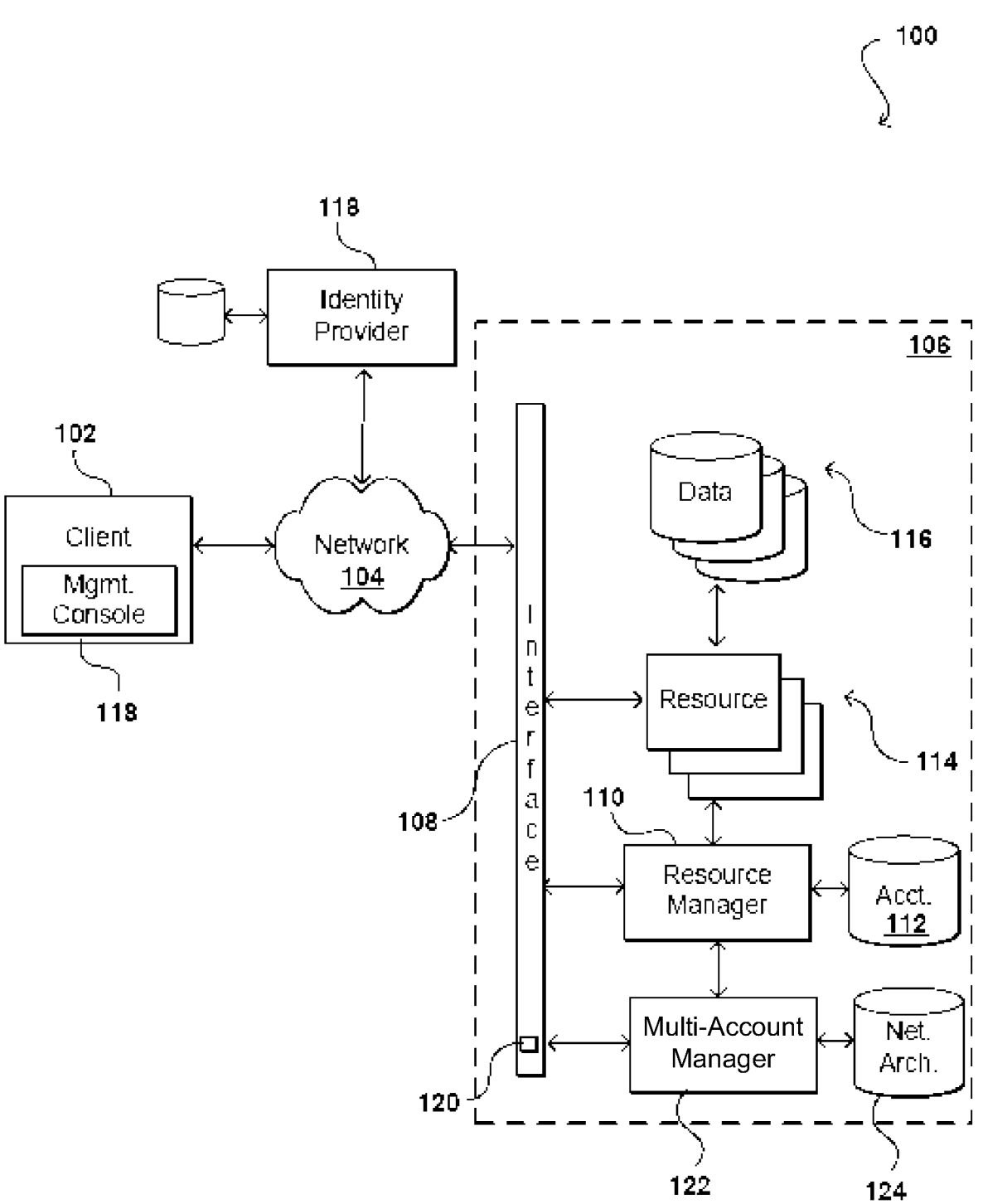
FIG. 1 illustrates an example system for that can be utilized in accordance with various embodiments.

FIG. 1 illustrates an example environment 100 in which aspects of various embodiments can be implemented. In this example a user is able to utilize a client device 102 to submit requests across at least one network 104 to a resource provider environment 106. The client device 102 can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 106 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

In various embodiments, the resource provider environment 106 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager 110 can utilize dedicated APIs 120 in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

In many instances a customer of a resource provider environment 106 may want to specify various parameters of a resource instance to be provisioned in such an environment. A customer, or user associated with a customer, might utilize a management console 118 executing on, or accessible through, a client device 102 in order to specify various parameters for a resource instance (physical or virtual) to be launched or provisioned in the resource provider environment 106. In order to avoid having to specify the same parameters each time a new instance is to be launched, a customer might utilize one or more resource parameter templates to launch or provision these new instances. An example resource parameter template can include values for at least a subset of parameters to be specified when launching an instance, as may vary by provider or type of instance. Example parameters might include, for example, instance type, instance identifier, machine image, encryption, virtual name, snapshot identifier, and the like. A customer might generate and populate these parameter fields in order to enable instances to be launched or provisioned without the need to manually specify the values to be used for the new instance(s). A user may use different templates for different provisioning actions.

In some embodiments, the resource provider environment 106 includes a multi-account manager 122. The multi-account manager 122 performs backend tasks for deploying commands to multiple target accounts based on a single user-inputted operation from a primary account. For example, the multi-account manager 122 may parse the single request or main template into a plurality of templates or subtemplates, identify the intended target account for each template or subtemplate, access the target account, and perform the specific actions required for deploying the template accordingly, among other tasks set forth below.

Figure 2:
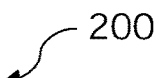
FIG. 2 is a representation of an application that is supported through multiple accounts, in accordance with various embodiments.

FIG. 2 is a representation 200 of an application 202 that is supported through multiple accounts 204a-e, in accordance with various embodiments. Some applications, such as multi-tier applications, are quite large that it is beneficial to deploy and manage different aspects of the application through different accounts and/or regions. For example, the front-end layer of the application may be deployed and managed using one or more accounts, the middleware (e.g., business logic, compute functions, microservices) layer may be deployed and managed through one or more other accounts, and the backend (e.g., databases) may be deployed and managed through yet one or more other accounts, such that these different layers of the application are all deployed and managed through separate accounts. Additionally, even within the same application layer, different aspects may be deployed and managed through different accounts. For example, a first database may be deployed and managed by a first account and a second database may be deployed and managed through a second account, etc. The different accounts 204a-e together provide the fully functioning application. Additionally, different aspects of the application may be deployed and managed through different regions. In some embodiments, an account may be established in a particular region. However, the account may utilize resources established in one or more regions. For example, the account may utilize a first database that is provisioned a first region and a second database that is provisioned in a second region, the user may define these or other types of dependencies between the actions. Deploying and managing different aspects of the application though different accounts and/or regions may be beneficial for several reasons. For example, if one region were to be down or if an account has some issues, some aspects of the application may be down, but it might not take down the entire application. Thus, it helps ensure availability of the application. Additionally, as the application gets large, it may become too cumbersome to manage everything from the same account.

However, distributing an entire application across multiple accounts and regions provides some inconveniences as well. Generally, with such architecture, a user would have to access the different accounts individually to make any changes to the stack for that account. Thus, it would be desirable to have technology that enables all of the stacks to be managed at once from a single account despite being distributed across multiple accounts and cloud environments. Accordingly, approaches in accordance with various embodiments provide technical solutions to the these challenges.

Figure 3:
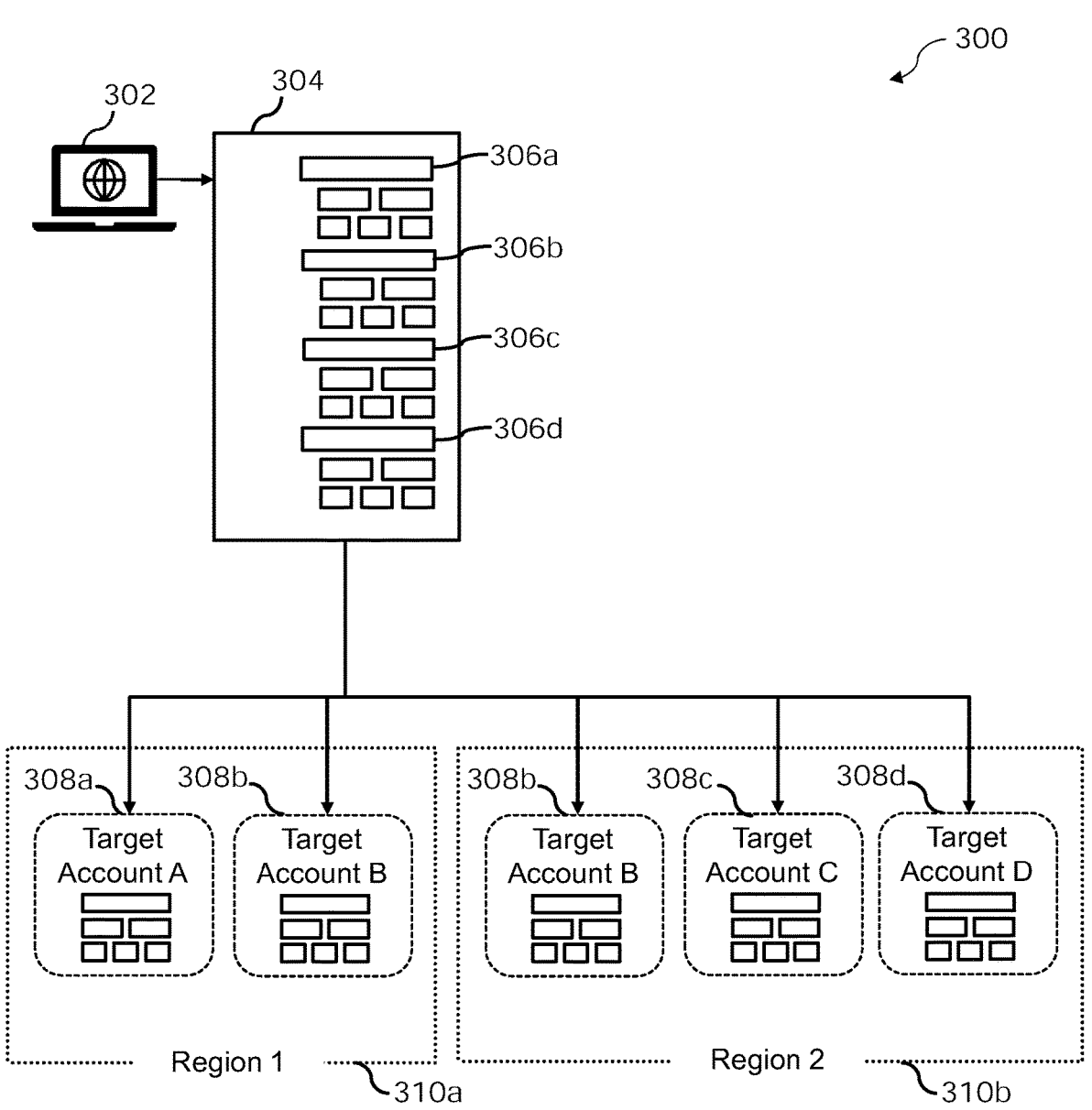
FIG. 3. illustrates deploying actions to multiple accounts through a single operation, in accordance with various embodiments.

FIG. 3 illustrates a system 300 capable deploying actions to multiple cloud environments through a single operation, in accordance with various embodiments. In this example, a user, through a client device 302, can provide a request (e.g., defined as code) to model, create, or manage any aspect of an entire application workload that is distributed across multiple accounts and/or regions that are typically managed through multiple separate accounts 308a-d. The request can specify various actions, definitions, and parameters, and the specific account in which to deploy each action. In some embodiments, a cloud provider receives such a request from a primary user account 302. The primary user account 302 may be associated with or otherwise authorized to create and/or manage a plurality of secondary or target user accounts 308a-d and/or regions 310a-b, which provide (i.e., host) different aspects of the same application. Thus, the actions to be deployed to the different accounts and/or regions may be different. In some embodiments, an account, such as account B 308*b*, can utilize resources deployed in more than one region. In the illustrated example, account B 308*b* utilizes resources deployed in both region 1 310*a* and region 2 310*b*. The cloud provider receives the request and determines one or more corresponding actions to deploy to the individual accounts defined in the request. For example, the request includes a first action to be deployed to a first account and a second action to be deployed to a second account. The cloud provider then deploys the respective actions to the respective accounts. In some embodiments, one or more of the plurality of actions includes creating one or more of the plurality of accounts. In some embodiments, the request defines one or more resources required for the actions, respectively. The one or more resources include at least one of a database, compute functions, front-end files, identity and access management roles or groups, CI/CD pipelines, among others.

The request received from the primary user account may also include one or more sets of parameters associated with the defined actions. Such parameters may be specifically defined by the user. In some embodiments, the cloud provider upon receiving the request from the primary user account, automatically determine and apply one or more appropriate parameters to an action based on what the actions is and the target account for the action.

In some embodiments, the user provides a main template 304 that includes a plurality of subtemplates 306*a-d*. The subtemplates 306*a-d* may be similar to the templates described above with reference to FIG. 1, which define specific actions for deployment to the individual target accounts. The main template 304 specifies which target account(s) to deploy to for each subtemplate. For example, subtemplate 306*a* is to be deployed to target account A 308*a*, subtemplate 306*b* is to be deployed to target account D 308*d*, subtemplate 306*c* is to be deployed to target account B 308*b* in region 1, and subtemplate 306*d* is to be deployed to target account C 308*c*. In some embodiments, the same subtemplate may be deployed to multiple target accounts. For example, subtemplate 306*a* may be deployed to both target account A 308*a* and target account B 308*b* in region 2. The main template 304 is an aggregation of all the different individual provisioning actions that the user wants to deploy to each individual target account. Thus, the user only needs to provide one main template through a single submission from the primary account 302. Each subtemplate 306*a-d* includes all of the definition and parameters required to carried out the intended deployment action. The cloud provider receives the main template and parses out the subtemplates and the corresponding accounts to which to deploy each template, and accordingly makes the respective deployment actions across the different target accounts. In some embodiments, the template 304 may be generated by the cloud provider based on discrete inputs from the user.

The request may provide additional instructions related to the actions. For example, in some embodiments, the request may provide various orchestration instructions, such as an order or timing scheme for which to deploy the actions. In some embodiments, the output or result of deploying on action may be required (e.g., as input) for another action.

Using the system and techniques disclosed herein, users can define as code the fundamental structure for their entire application workload including the logical deployment stages, cloud environments and associated accounts, the resource fleet that should be created within each cloud environment, and the global resources such as identity and access management roles, CI/CD pipelines that need to be setup and configured, and the like. Users can also explicitly specify within that definition deployment configurations for automating orchestration of the various provisioning actions across multiple accounts and regions to create and manage all the necessary infrastructure throughout the application's lifecycle. User can also then leverage that definition in a repeatable manner across their workload portfolio.

The declarations can be communicated through various interfacing types, such as a user console, an API, or an SDK. Users can define the structure required by an application workload using templates declaratively in YAML/JSON. As part of the template definition, users can specify what kind of unique cloud environments and resources their workload components require, along with associated configuration such as unique identity and access management permission structure for accessing the various resources across multiple accounts and regions. Users can also define the global resources that need to be created, and how they will be shared across various cloud environments. Users can also specify the target groups (accounts, regions), deployment configuration. This may include providing an explicit provisioning order across deployment targets, indicating cross component dependencies such as being able to refer the output from the provisioning action of one component into the provisioning action of another component, and custom parameters that need to be uniquely applied to the provisioning actions of individual components. Inherent deployment safety and failure tolerance may also be applied so that customers can rectify issues as they occur and not deal with painful rollbacks.

FIG. 4 illustrates an example process 400 for managing an application that is distributed across multiple accounts through a single operation from a single account, in accordance with various embodiments. It should be understood that there can be additional, fewer, or alternative steps performed in similar or alternative orders, or in parallel, within the scope of the various embodiments unless otherwise specifically stated. In this example, a request is received 402 from a primary account to perform a plurality of actions across of plurality of target accounts. The plurality of target accounts together support different aspects of an application. For example, one or more or the plurality of target accounts provide a front-end of the application, middleware for the application, or a back-end for the application. Each target account may be tied to separate local resources. The target accounts may also utilize some global resources shared across the target accounts. In some embodiments, the target accounts may be associated with different regions. For example, a target account itself may be deployed in one region. A target account may also have resources deployed across multiple different regions. The request may include instructions for modeling, creating, or managing the application across the plurality of cloud environments. In some embodiments, the request may include code that defines a fundamental structure for the application including at least one of logical deployment states, identity and access managements roles, respective resources required within the plurality of cloud environments, global resources shared across the plurality of accounts, CI/CD pipelines, or orchestration instructions.

It is determined 404 that the primary account is authorized to make changes to the target accounts. This step may be performed at any point in the process and in several ways. For example, in one embodiment, the primary account may be tied to a plurality of target accounts and the user may only have those target accounts available to select from. Thus, the authentication is implicit and may occur before receiving the request. In another embodiment, the target account identities may be provided by the user and then authentication may be performed upon receiving the request.

The plurality of actions in the request may be individually identified 406. In some embodiments, these individual actions may be written as templates, also be referred to as subtemplates, which are aggregated into a main templated submitted as a part of the request. In some embodiments, a template defines the actions to be deployed as well as various definitions and/or parameters, including any resources required. For example, the resources may include at least one of a database, compute functions, front-end files, identity and access management roles or groups, or CI/CD pipelines. Then for each template, the corresponding target accounts are determined 408 in which to deploy each template. For example, the request may indicate that template 1 should be deployed to target account C, template 2 should be deployed to target account H, template 3 should be deployed to accounts A and B, and so forth. In some embodiments, a target account may not yet exist and a part of an action is to create the account. An order or timing scheme for deploying the actions is also determined 410. For example, the request may indicate that a first action should be deployed before a second action. In some embodiments, the output or result of deploying on action may be required (e.g., as input) for another action. Such a dependency may be defined in the request. In some embodiments, the request may not designate any such order or timing requirements, and a default scheme may be applied. For example, the deployments may be made simultaneously, in the coded order, among others. A set of custom parameters for corresponding to the individual templates may be determined 412. Some or all of the parameters may be set by the user and provided with the request. In some cases, the cloud provider, upon receiving the request and while processing the request, may also automatically determine one or more appropriate parameters for an action based on what the actions is and the intended target account for the action. The actions with the corresponding parameters are then deployed 414 to the respective target accounts as designated in the request.

Figure 5:
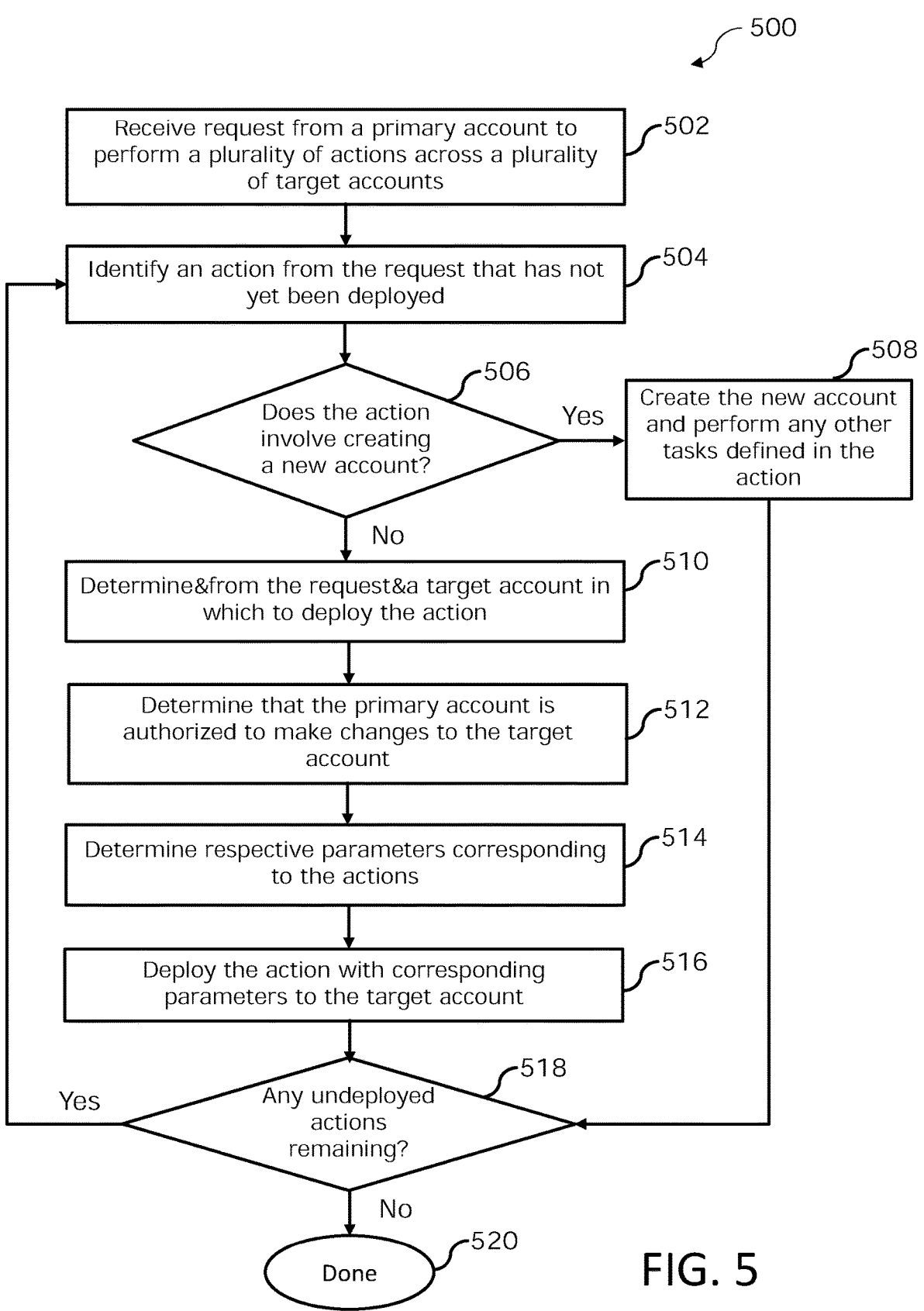
FIG. 5 illustrates another example process for managing an application that is distributed across multiple accounts through a single operation from a single account, in accordance with various embodiments.

FIG. 5 illustrates another example process 500 for managing an application that is distributed across multiple accounts through a single operation from a single account, in accordance with various embodiments. In this example, a request is received 502 from a primary account to perform a plurality of actions across of plurality of target accounts. Each target account may be tied to with separate local resources. In some embodiments, the target accounts may also utilize some global resources shared across the target accounts. In some embodiments, the target accounts may be associated with different regions. The plurality of target accounts together support different aspects of an application. In some embodiments, the target accounts may be associated with different regions. In some embodiments, the request may include instructions for modeling, creating, or managing the application across the plurality of accounts. In some embodiments, the request may include code that defines a fundamental structure for the application including at least one of logical deployment states, identity and access managements roles, respective resources required within the plurality of cloud environments, global resources shared across the plurality of cloud environments such as CI/CD pipelines, or orchestration instructions.

The request includes a plurality of actions to be deployed respectively to a plurality target accounts. Thus, one such action defined in the request that has not yet been deployed is identified 504. It is then determined 506 whether the action involves creating a new account. If the action does involve creating a new account, the new account is then created 508 and any other tasks defined in the action is also performed. In some embodiments, the request may include one or more parameters to be used in creating the account. If the action does not involve creating a new account, then the target account designated for that action is determined 510. It is also determined 512 that the primary account is authorized to make changes to that target account. This step may be performed at any point in the process and in several ways. For example, in one embodiment, the primary account may be tied to a plurality of target accounts and the user may only have those target accounts available to select from. Thus, the authentication is implicit and may occur before receiving the request. In another embodiment, the target account identities may be provided by the user and then authentication may be performed upon receiving the request. In some embodiments, a set of custom parameters for the action may be determined 514 from the request. Some or all of the parameters may be set by the user and provided with the request. In some cases, the cloud provider, upon receiving the request and while processing the request, may also automatically determine one or more appropriate parameters for an action based on what the actions is and the intended target account for the action. Then the action is deployed 516 to the designated target account.

A determination 518 is then made for whether there are actions in the request that have not been deployed. If not, then the process is complete 520. If there are actions remaining, then steps 504 through 516 are performed for each action. In some embodiments, the process may not be performed linearly with one templated being deployed after another. Rather, the templates may be deployed at the same time, in a specific order or timing scheme, of independently of each other. The loop is only meant to illustrate how each template may be handled. In some embodiments, not all of the actions in the request will be deployed. For example, the cloud provider may detect that the intended result of an action already exists and thus determines that the action does not need to be deployed.

The present system and techniques provide an avenue to declaratively define as code most aspects of the infrastructure that is required to deploy the application workload. Users specify the logical deployment stages, the various cloud environments/resources their application workload needs, and the deployment configuration preferences to explicitly state in which order each provisioning action needs to happen. This provides a streamlined mechanism for users to define the various correlated provisioning actions and contextualize them as belonging to an application workload. In some embodiments, the request may indicate an order or timing scheme for which to deploy the templates.

Figure 6:
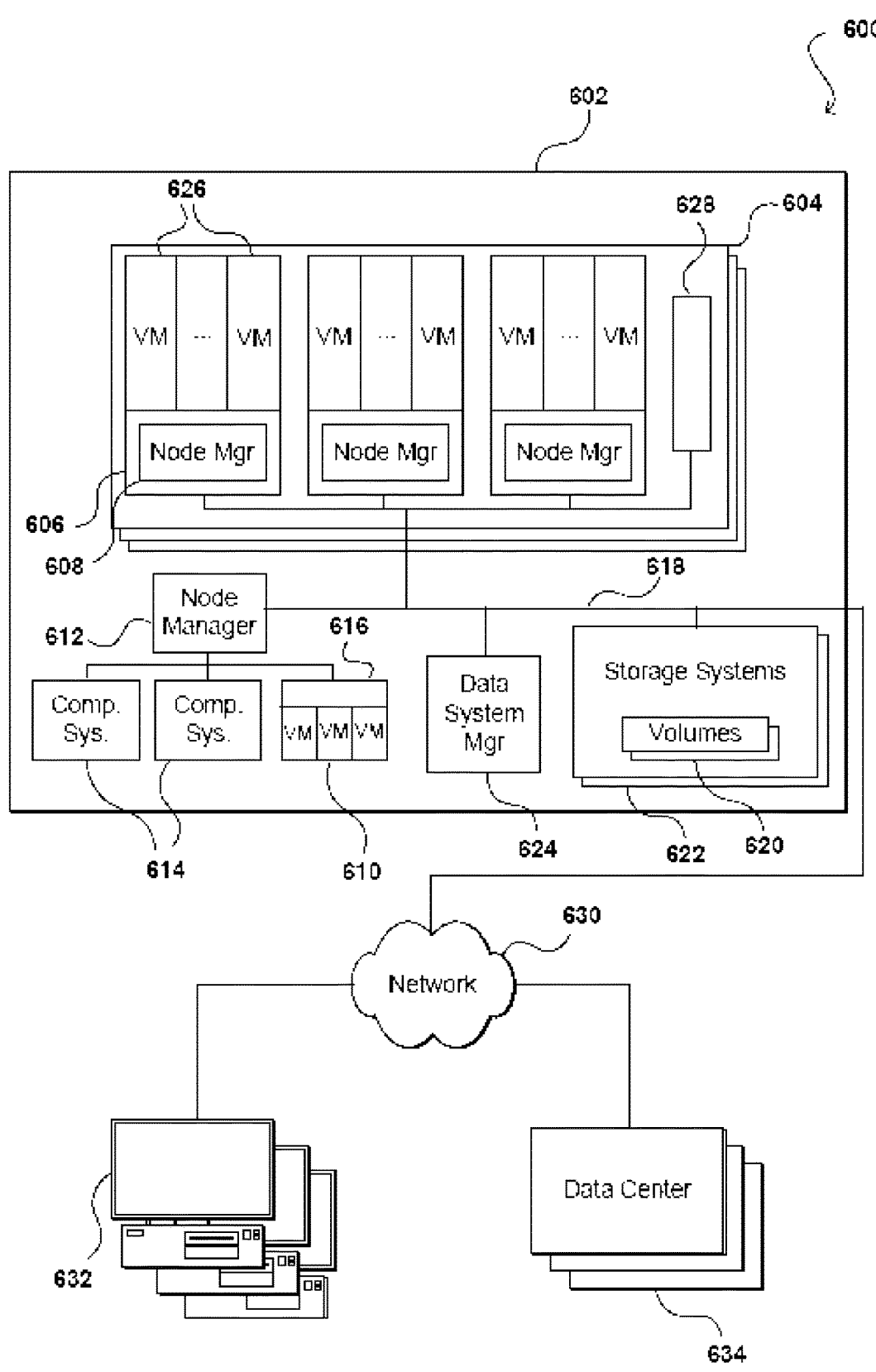
FIG. 6 illustrates components of an example data center that can be utilized in accordance with various embodiments.

FIG. 6 illustrates an example network configuration 600 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based storage to executing programs or various other components, systems, or services. Multiple remote archival storage systems external to the data center may also be used to store additional copies of at least some portions of at least some block-based data storage volumes.

In this example, a data center 602 includes a number of racks 604, each rack including a number of host computing devices 606, as well as an optional rack support computing system 628 in this example embodiment. The host computing systems 606 on the illustrated rack 604 each host one or more virtual machines 626 in this example, as well as a distinct node manager module 612 associated with the virtual machines on that host computing system to manage those virtual machines. One or more other host computing systems 616 may also each host one or more virtual machines 610 in this example. Each virtual machine 610 may act as an independent resource node for executing one or more program copies or performing another such action or process for user data requests, I/O operations, etc. In addition, this example data center 602 further includes additional host computing systems 614 that do not include distinct virtual machines, but may nonetheless each act as a resource node for one or more tasks being executed for a user. In this example, a node manager module 612 executing on a computing system (not shown) distinct from the host computing systems 614 and 616 is associated with those host computing systems to manage the resource nodes provided by those host computing systems, such as in a manner similar to the node manager modules 608 for the host computing systems 606. The rack support computing system 628 may provide various utility services for other computing systems local to its rack 604 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 602 also includes a computing system 624 that executes a data storage system manager module for the block-based data storage service to assist in managing the availability of non-local block-based data storage to programs executing on resource nodes provided by the host computing systems located within the data center (or optionally on computing systems located in one or more other data centers 634, or other remote computing systems 632 external to the data center). In particular, in this example the data center 602 includes a pool of multiple block-based data storage systems 622, which each have local block-based storage for use in storing one or more volume copies 620. Access to the volume copies 620 is provided over the internal network(s) 618 to programs executing on various resource nodes 610 and 614. As discussed in greater detail elsewhere, a block-based data storage system manager module 624 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 622 may coordinate with the node manager modules 612, 608 to manage use of volumes by programs executing on associated resource nodes, while in other embodiments the node manager modules may not be used to manage such volume use. In addition, in other embodiments, one or more system manager modules 624 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 622 (e.g., in a peer-to-peer manner, without any separate centralized system manager module on a computing system 624).

In this example, the various host computing systems, server block data storage systems, and computing systems are interconnected via one or more internal networks 618 of the data center, which may include various networking devices (e.g., routers, switches, gateways, etc.) that are not shown. In addition, the internal networks 618 are connected to an external network 630 (e.g., the Internet or another public data network) in this example, and the data center 602 may further include one or more optional devices (not shown) at the interconnect between the data center and an external network (e.g., network proxies, load balancers, network address translation devices, etc.). In this example, the data center 602 is connected via the external network 630 to one or more other data centers 634 that each may include some or all of the computing systems and storage systems illustrated with respect to data center 602, as well as other remote computing systems 632 external to the data center. The other computing systems 632 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 6 has been simplified for the purposes of explanation, and that the number and organization of host computing systems, server block data storage systems and other devices may be much larger than what is depicted in FIG. 6. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 6 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 6, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "Detach Volume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface or communication elements or components 710 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 712, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML)

format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a request from a primary user account to perform a plurality of actions across a plurality of target user accounts, regions or both, wherein the plurality of target user accounts, regions or both are able to provide different aspects of an application, wherein at least one of the plurality of actions includes creating at least one of a new user account or a new region, and wherein the request includes a main template that includes a plurality of different subtemplates, an individual subtemplate of the plurality of subtemplates defining an individual action of the plurality of actions, one or more parameters for the individual action, and one or more specific target user accounts or regions in which to deploy the individual subtemplate;
determining that the primary user account is authorized to make changes to the plurality of target user accounts, regions or both;
identifying, from the main template, both the plurality of subtemplates and the respective target user accounts, regions or both in which to deploy the individual subtemplate;
identifying, from the main template, both the respective individual actions and one or more respective definitions or parameters for the individual actions associated with the individual subtemplate; and
deploying, based on the request, the identified plurality of subtemplates and associated definitions or parameters to the identified corresponding target user accounts, regions or both, wherein a first subtemplate of the subtemplates with a first set of the definitions or parameters is deployed to at least one of a first target user account, of the target user accounts, or a first region, of the regions, and a second subtemplate of the subtemplates with a second set of the definitions or parameters is deployed to at least one of a second target user account, of the target user accounts, or a second region, of the regions, wherein the first subtemplate is different from the second subtemplate.

2. The computer-implemented method of claim 1, wherein the request includes instructions for modeling, creating, or managing the application across the plurality of target user accounts, regions or both.

3. The computer-implemented method of claim 1, wherein the request includes code that defines a structure for the application including at least one of logical deployment states, identity and access managements roles, respective resources required within a plurality of cloud environments, global resources shared across the plurality of cloud environments, or orchestration instructions.

4. The computer-implemented method of claim 1, wherein one or more or the plurality of target user accounts, regions or both provide different tiers of a multi-tier application.

5. A computer-implemented method, comprising:
receiving, from a primary user account, a request to deploy a plurality of actions across a plurality of target user accounts, regions or both, wherein at least one of the plurality of actions includes creating at least one of a new user account or a new region;
determining, based on the request, one or more corresponding actions of the plurality of actions to deploy to individual target user accounts or regions of the plurality of target user accounts, regions or both, wherein a first action of the corresponding actions to be deployed to a first user account or region of the target user accounts or regions is different from a second action of the corresponding actions to be deployed to a second user account or region of the target user accounts or regions; and
deploying the one or more corresponding actions to the individual target user accounts, regions or both.

6. The computer-implemented method of claim 5, wherein a target user account includes one or more resources deployed in one or more regions.

7. The computer-implemented method of claim 5, wherein at least some of the plurality of target user accounts, regions or both provide different aspects of an application, and at least some of the plurality of actions are different.

8. The computer-implemented method of claim 5, wherein the primary user account is authorized to create or make changes to the plurality of target user accounts, regions or both.

9. The computer-implemented method of claim 5, wherein one or more of the plurality of actions includes creating one or more of the plurality of target user accounts, regions or both.

10. The computer-implemented method of claim 5, wherein the request defines one or more logical deployment stages for the plurality of actions.

11. The computer-implemented method of claim 5, wherein the request defines an order or timing with which to deploy the plurality of actions.

12. The computer-implemented method of claim 5, wherein the request defines one or more resources required for the plurality of target user accounts, regions or both, respectively.

13. The computer-implemented method of claim 12, wherein the one or more resources include at least one of a database, compute functions, front-end files, identity and access management roles or groups, or CI/CD pipelines.

14. The computer-implemented method of claim 5, wherein the request includes a main template comprising a plurality of subtemplates to be deployed to the plurality of target user accounts, regions or both.

15. The computer-implemented method of claim 5, wherein the request is received as user-defined code.

16. A system, comprising:

at least one processor; and a memory device including instructions that, when executed by the at least one processor, cause the system to:

receive, from a primary user account, a request to deploy a plurality of actions across a plurality of target user accounts, regions or both, wherein at least one of the plurality of actions includes creating at least one of a new user account or a new region;

determine, based on the request, one or more corresponding actions of the plurality of actions to deploy to individual target user accounts or regions of the plurality of target user accounts, regions or both, wherein a first action of the corresponding actions to be deployed to a first target user account or region of the target user accounts or regions is different from a second action of the corresponding actions to be deployed to a second target user account or region of the target user accounts or regions; and deploy the one or more corresponding actions to the individual target user accounts, regions or both.

17. The system of claim 16, wherein one or more of the plurality of actions includes creating one or more of the plurality of target user accounts, regions or both.

18. The system of claim 16, wherein the request defines one or more logical deployment stages for the plurality of actions.

19. The system of claim 16, wherein the request defines an order or timing with which to deploy the plurality of actions.

20. The system of claim 16, wherein the request defines one or more resources required for the plurality of target user accounts, regions or both, respectively.

\* \* \* \* \*